United States Patent [19]

Stroman et al.

[11] Patent Number: 5,908,117
[45] Date of Patent: Jun. 1, 1999

[54] CONTINUOUS CONVEYOR BELT

[75] Inventors: Richard D. Stroman; Glenn A. Waller, both of Walla Walla, Wash.

[73] Assignee: Key Technology, Inc., Walla Walla, Wash.

[21] Appl. No.: 08/857,102

[22] Filed: May 15, 1997

[51] Int. Cl.[6] .................................................. B07C 5/00
[52] U.S. Cl. ...................... 209/639; 209/644; 209/923; 198/850
[58] Field of Search .................................. 209/639, 644, 209/587, 577, 912, 923, 939; 198/339.1, 850, 851, 831

[56] References Cited

U.S. PATENT DOCUMENTS

| | | | |
|---|---|---|---|
| 979,200 | 12/1910 | Prosser . | |
| 1,484,248 | 2/1924 | Austin . | |
| 3,641,831 | 2/1972 | Palmaer | 74/250 C |
| 3,826,150 | 7/1974 | Palmaer | 74/250 |
| 4,313,535 | 2/1982 | Carmichael | 198/766 |
| 4,723,660 | 2/1988 | Sjoberg | 209/622 |
| 4,742,907 | 5/1988 | Palmaer | 198/831 |
| 4,901,861 | 2/1990 | Cicchelli | 209/539 |
| 4,901,866 | 2/1990 | Barella | 211/1.3 |
| 5,069,330 | 12/1991 | Palmaer et al. | 198/778 |
| 5,090,576 | 2/1992 | Menten | 209/639 X |
| 5,167,771 | 12/1992 | Sayers et al. | 162/358.4 |
| 5,181,601 | 1/1993 | Palmaer et al. | 198/831 |
| 5,224,583 | 7/1993 | Palmaer et al. | 198/779 |
| 5,253,749 | 10/1993 | Ensch | 198/850 |
| 5,339,965 | 8/1994 | Klukis et al. | 209/639 |
| 5,431,289 | 7/1995 | Hoffman | 209/639 X |
| 5,482,166 | 1/1996 | Brown | 209/639 X |
| 5,543,015 | 8/1996 | Jermo | 162/358.4 |

OTHER PUBLICATIONS

Excerpts from KVP Systems, Inc., Rancho Cordova, CA 95670, brochure, "Innovators of Engineered Plastic Conveyor and Material Handling Components".

Excerpts from Intralox brochure, Series 600, 2–24 Product Line, Intralox System, Series 400, 500, 600, Series CC40 belt, all plastic modular conveyor belts.

Loctronic Graders Limited, Danbury, Chelmsford, Essex, England, brochure "The Loctronic Autoselector".

Series 40, "Belt Accessories—Special Belts" CC40.

*Primary Examiner*—David H. Bollinger
*Attorney, Agent, or Firm*—Wells, St. John, Roberts, Gregory & Matkin, P.S.

[57] ABSTRACT

A continuous conveyor belt for transporting a stream of objects to an inspection station includes a plurality of links matingly joined together to form a surface for supporting the objects for movement along a given path of travel to the inspection station, and wherein the continuous conveyor belt is entrained between a drive roller and a nose bar which has a given diametral dimension, and wherein the continuous conveyor belt propels the objects into free flight and in a given pattern through a sorting station which is disposed downstream of, and in spaced relation relative to the nose bar, and wherein the individual links when passing about the nose bar effectively minimizes the size of the object pattern passing through the sorting station, while simultaneously maintaining product separation which permits imaging of substantially the entire surface area of each product.

46 Claims, 7 Drawing Sheets

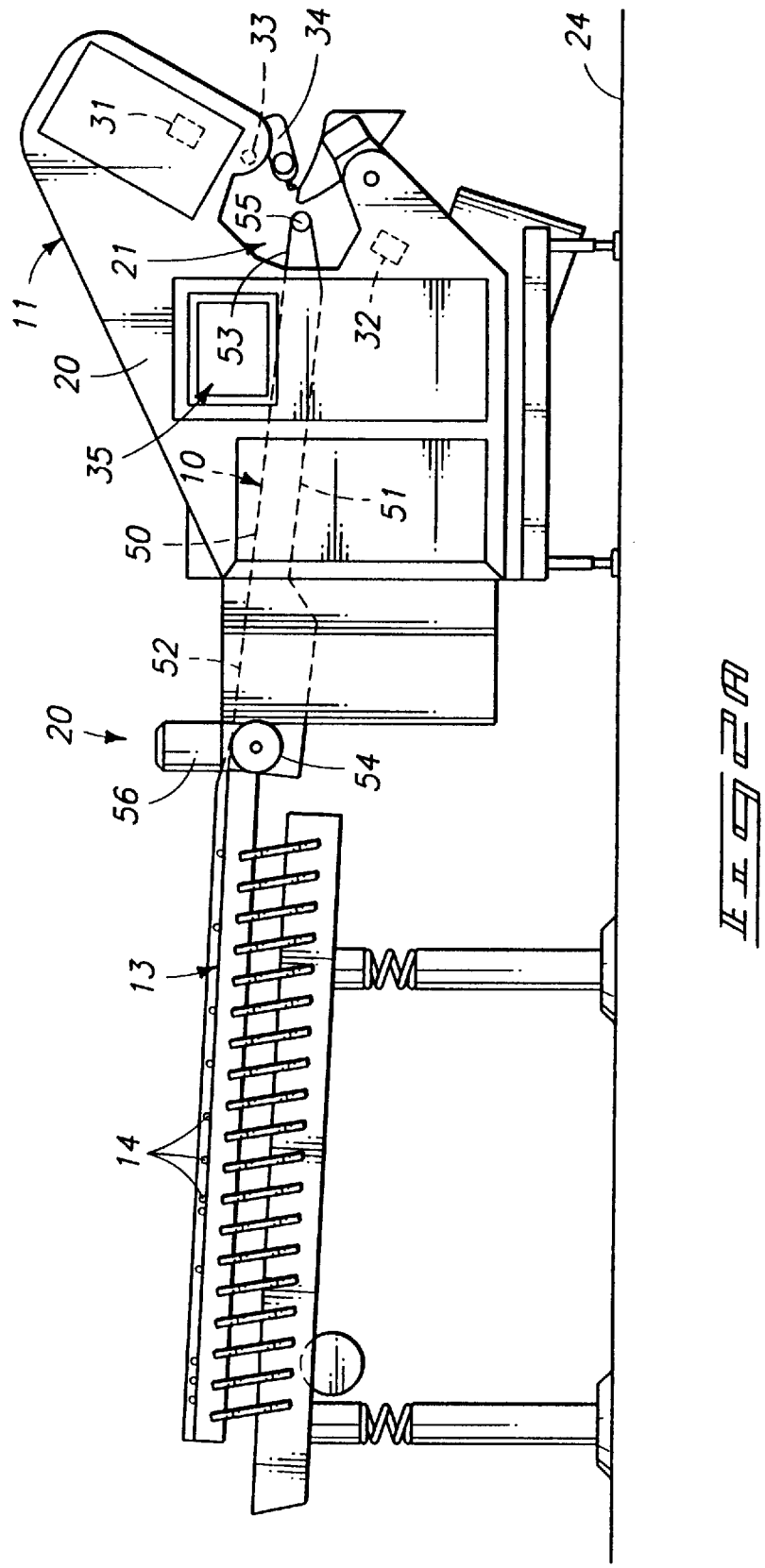

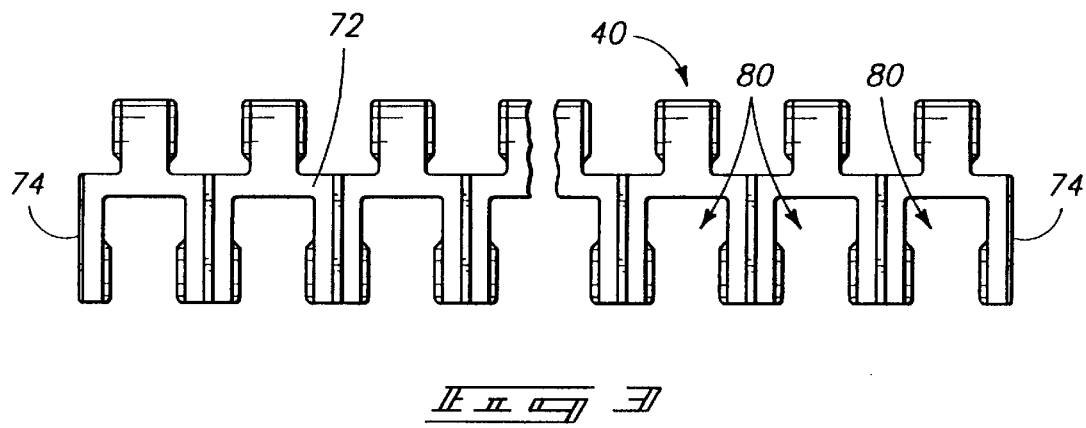
_Fig. 3_
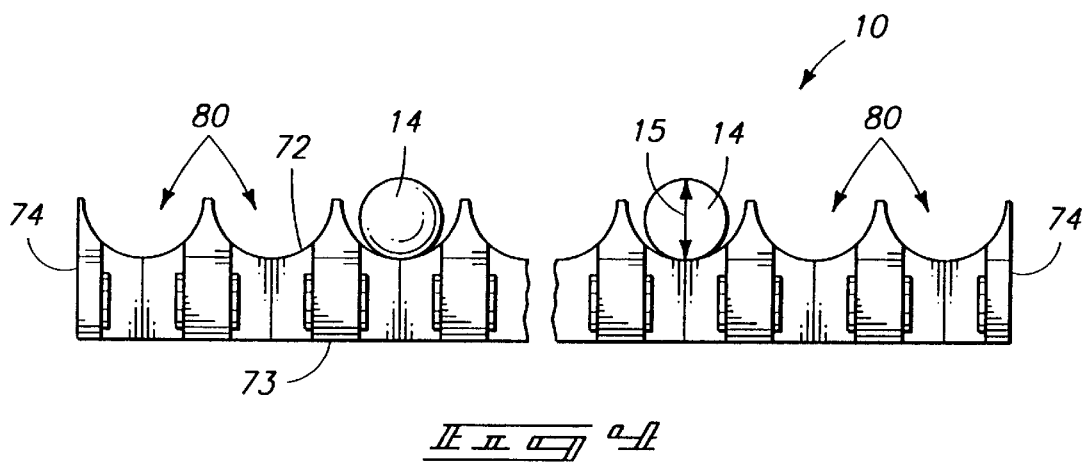
_Fig. 4_

CONTINUOUS CONVEYOR BELT

TECHNICAL FIELD

The present invention relates to a continuous conveyor belt and more specifically, to a continuous conveyor belt which propels a stream of objects into free flight, and through an adjacent sorting station.

BACKGROUND OF THE INVENTION

The prior art is replete with numerous examples of continuous conveyor belts utilized in combination with assorted other manufacturing devices to achieve various objectives.

For example, the prior art includes conveyor assemblies which are utilized in combination with imaging and air ejector mechanisms to effectively remove defective products and other undesirable debris from a stream of bulk products which have been propelled into free flight by the conveyor assembly and through an adjoining inspection station. An example of a prior art assembly having these characteristics is manufactured by Key Technology, Inc., of Walla Walla, Washington, under the trademark "Tegra". This device includes imaging devices which have implementing hardware and software which not only recognizes color and size, but also the shape of the products being carried by the associated conveyor assembly. The software and related hardware allows the imaging devices to detect color subtleties beyond human vision. Further, the imaging devices used in this same assembly facilitates spacial resolution by means of square pixels which provides enhanced visual acuity with respect to the color and shape of the products as they are propelled by the associated conveyor into free flight. In this same sorting device, defective products are removed from the air-borne product stream by an air ejector mechanism which directs accurately timed air pulses at the centroid of the individual products. These timed pulses of air effectively removes the defective products from the product stream as they pass through a sorting station. Still further, this present device employs a catenary belt profile which utilizes centrifugal stabilization to provide a stable product feed stream through the inspection station and improved trajectory following propulsion from the end of the conveyor assembly. In addition, the imaging assembly, and air ejector mechanism can also be employed with a substantially planer or flat belt instead of the catenary belt profile disclosed above. This assembly including the implementing hardware and software is disclosed in detail in application Ser. No. PCT/US96/12814, the teachings of which are incorporated by reference herein.

While the prior art devices have operated with varying degrees of success, there have been shortcomings which have detracted from their usefulness. For example, there is a tendency for bulk product delivered to such conveyor assemblies (both planar and catenary profiles) to roll or otherwise move laterally relative to the direction of movement of the conveyor belt as it is being carried in the direction of the inspection station. This lateral movement of the bulk product on the conveyor assembly is not desirable inasmuch as the given trajectory of the bulk products, once launched into free flight by the conveyor assembly, tends to be less than predictable. Consequently, ejector mechanisms, as described above, must be positioned at some distance from the product stream or pattern. In view of this spacial relationship, the action of the air ejectors may not be optimal in removing undesirable products from the overall product stream.

Still further, another shortcoming which has detracted from the performance of the prior art devices has been the propensity for the bulk products moving through the sorting station to be oriented in such a position that the imaging devices employed with same cannot see the entire surface area of the individual products passing through the sorting station. When this event occurs, some products may pass through the inspection station with undetected anomalies which would normally have rendered them undesirable from an end user standpoint.

An improved modular, continuous conveyor belt for transporting a stream of objects to an inspection station is the subject matter of the present application.

BRIEF DESCRIPTION OF THE DRAWINGS

Preferred embodiments of the invention are described below with reference to the following accompanying drawings.

FIG. 2A is a somewhat reduced diagrammatic, greatly simplified, side elevation view of an alternative form of the invention.

FIG. 3 is a plan view of an individual link employed with the continuous conveyor belt assembly of the present invention.

FIG. 4 is a side elevation view of an individual link employed in the continuous conveyor assembly of the present invention.

DETAILED DESCRIPTION OF THE PREFERRED EMBODIMENTS

Figure 1:
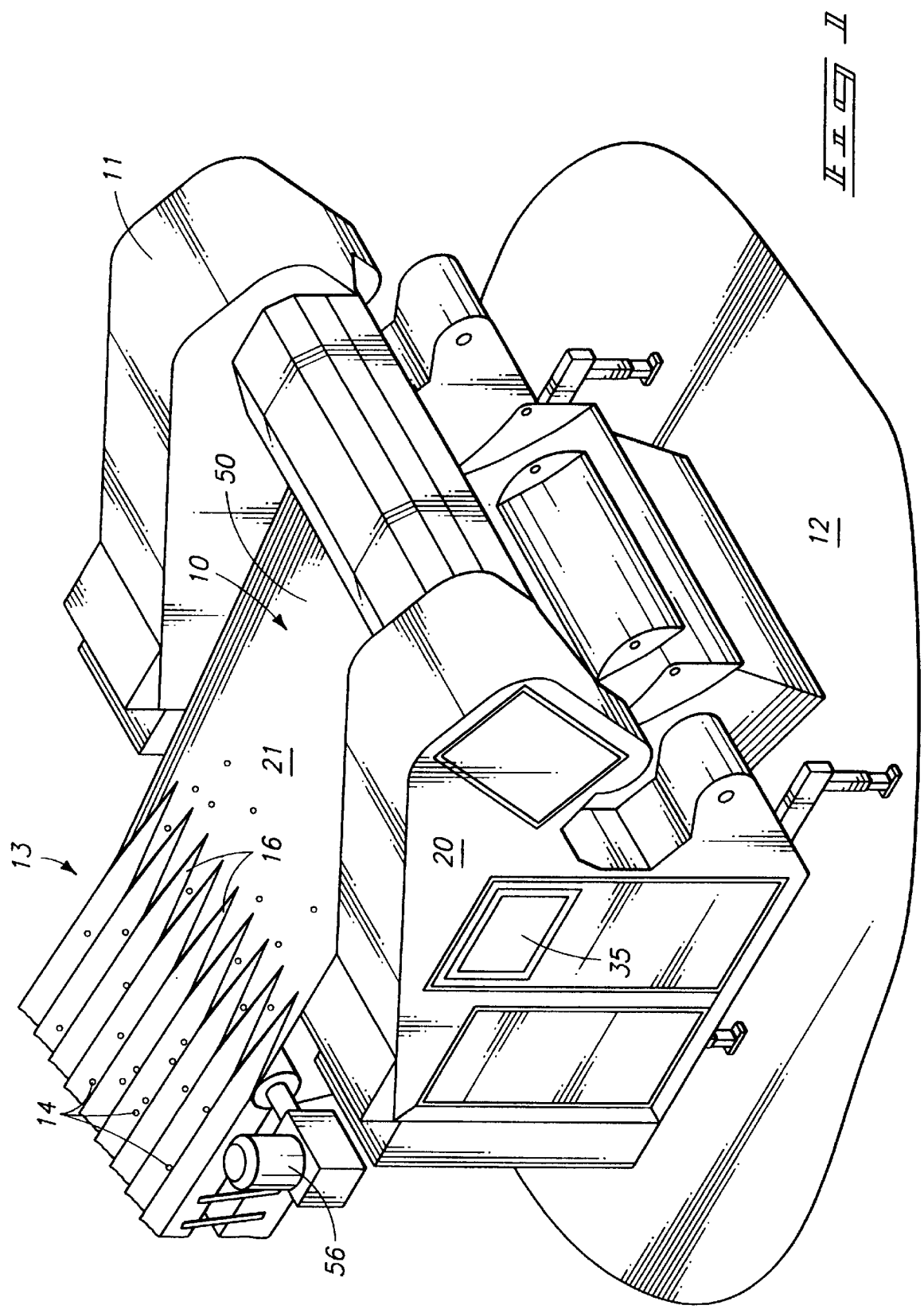
FIG. 1 is a perspective, environmental view of a sorting device which employs the continuous conveyor belt of the present invention.

This disclosure of the invention is submitted in furtherance of the constitutional purposes of the U.S. Patent Laws "to promote the progress of science and useful arts" (Article 1, Section 8).

In accordance with one aspect of the present invention, a continuous conveyor belt for transporting a stream of objects to an inspection station comprises a plurality of links matingly joined together to form a surface for supporting the objects for movement along a given path of travel to the inspection station, and wherein the continuous conveyor belt is entrained between a drive roller and a nose bar which has a given diametral dimension, and wherein the continuous conveyor belt propels the objects into free flight and in a given air-borne pattern through a sorting station which is disposed downstream of, and in spaced relation relative to, the nose bar, and wherein the individual links when passing about the nose bar effectively minimizes the size of the air-borne object pattern passing through the sorting station, while simultaneously providing the objects in predetermined spaced relationship for imaging purposes Another aspect of the present invention relates to a continuous conveyor belt for transporting a stream of objects to an inspection station comprising a plurality of links matingly joined together to form a surface for supporting the objects for movement along a given path of travel to the inspection station, the individual links having a pitch of about 0.5 inches to about 1.5 inches, and wherein the plurality of links define a plurality of substantially continuous, longitudinally oriented channels for receiving the objects and spacing the individual objects a given distance apart.

Yet another aspect of the present invention relates to a continuous conveyor belt for transporting a stream of objects comprising an upwardly facing supporting surface for supporting the objects, the upwardly facing supporting surface having a plurality of substantially continuous, longitudinally disposed channels formed therein, and wherein the objects have a given height dimension represented by the variable x, and wherein the plurality of continuous channels are spaced a given distance apart which is substantially about 1.1x to about 2.4x.

Yet still another aspect of the present invention relates to a continuous conveyor belt for transporting a stream of objects to an inspection station comprising a plurality of links matingly joined together to form a surface for supporting the objects for movement along a given path of travel to the inspection station, and wherein the continuous conveyor belt defines a plurality of substantially continuous, longitudinally oriented channels for receiving the objects and spacing the objects a given distance apart, and wherein the objects have a given height dimension represented by the variable x, and wherein the given distance the longitudinally oriented channels spaces the individual objects apart is equal to about 1.1x to about 2.4x, and wherein the individual links have a pitch of about 0.5 inches to about 1.5 inches, and the continuous conveyor belt is entrained between a drive roller and a nose bar which has a diametral dimension of about 1.5 inches to about 4 inches, and wherein the continuous conveyor belt propels the objects into free flight, and in a given air-borne pattern through a sorting station which is disposed downstream of, and in spaced relation relative to, the nose bar, and wherein the individual links when passing about the nose bar effectively minimizes the size of the air-borne object pattern passing through the sorting station.

An alternative embodiment (FIG. 6) is shown in the accompanying drawings as will become apparent from the continuing discussion. Further, the continuous conveyor belt 10 may be entrained in catenary profile (FIG. 2) or a flat profile (FIG. 2A).

Figure 2:
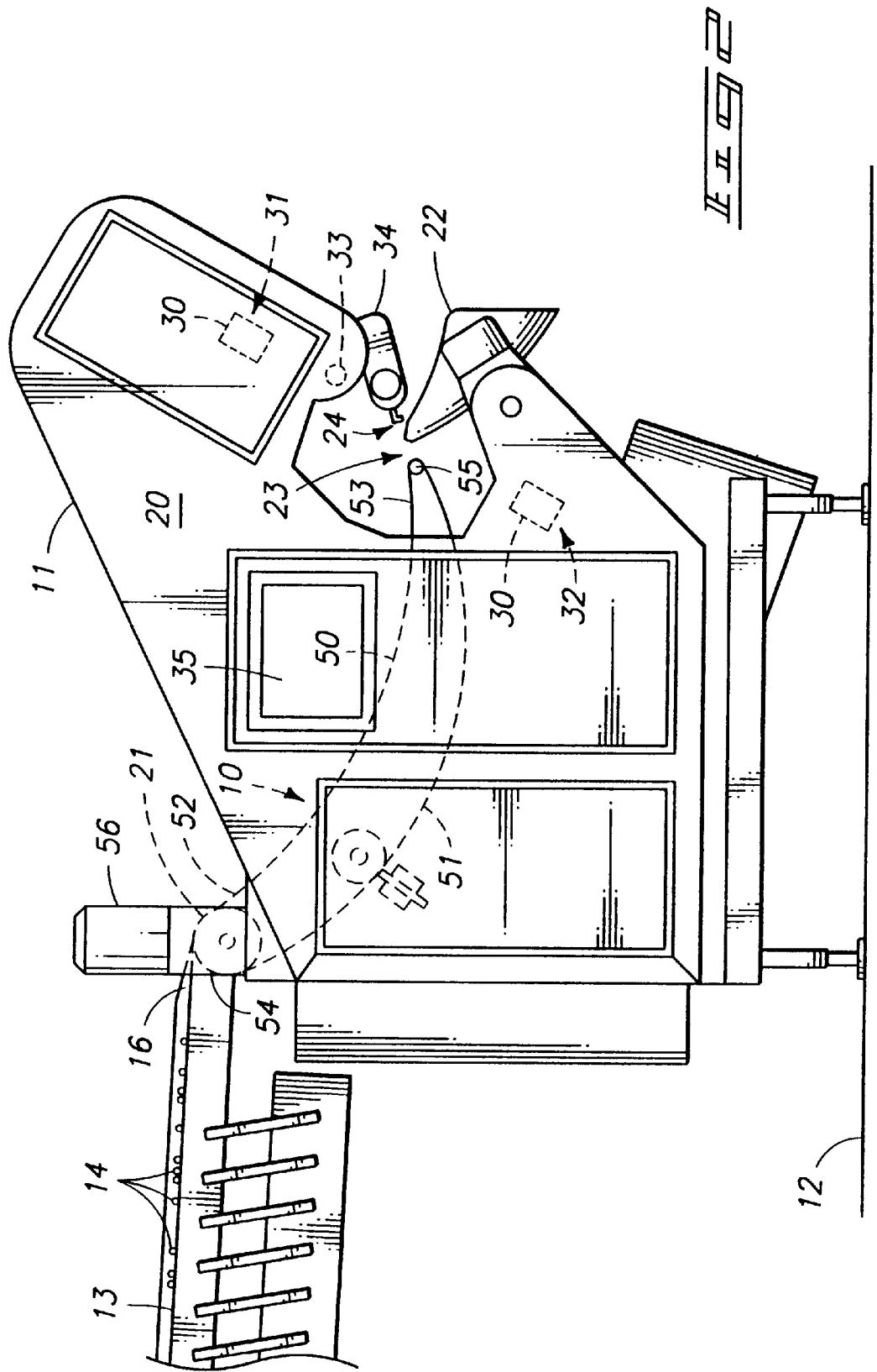
FIG. 2 is a diagrammatic, greatly simplified, vertical, sectional view taken from a position along line 2—2 of FIG. 1.

Referring now to FIGS. 1 and 2, the continuous conveyor belt 10 of the present invention is shown mounted on a sorting device 11 of conventional design. In particular, the sorting device 11 which is illustrated, is manufactured under the trademark "Tegra" by Key Technology, Inc., of Walla Walla, Wash. The sorting device 11 rests on a supporting surface 12, and further works in combination with an intake conveyor or vibratory feeding device 13 which delivers a stream of bulk product 14 to be sorted to the sorting device 11. The intake conveyor, or vibratory feeding device as shown is described in detail in U.S. Pat. No. 4,313,535, the teachings of which are incorporate by reference herein. Therefore, for purposes of brevity, the intake conveyor or vibratory feeding device 13 is not discussed in greater detail herein. As seen in FIG. 4, each of the bulk products 14 to be sorted have a given height dimension which is generally indicated by the line labeled 15. For illustrative purposes the bulk product 14 shown is peas (and carrots in FIG. 6), but other bulk food products such as french fries can be sorted with equal success. The vibratory feeding device incorporates alignment members 16 which channel or otherwise orient the bulk products into the channels defined by the continuous bvelt 10. The belt is described in further detail, below.

Figure 7:
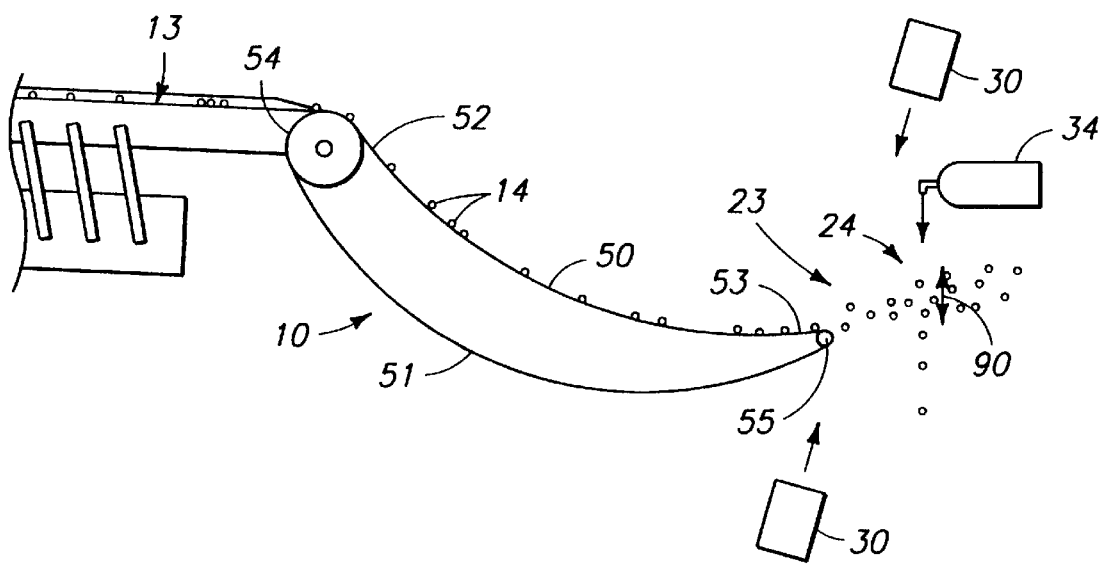
FIG. 7 is a greatly simplified schematic representation of a prior art device employing the continuous conveyor belt assembly of the present invention.

Referring now to FIGS. 1, 2, 2A, and 7, the sorting device 11 includes a frame 20 which has a first or intake end 21, and an opposite second, exhaust or discharge end 22. An inspection station 23 is located near the second or exhaust end 22. Further, a sorting station 24 is disposed downstream of, and in spaced relation relative to, the inspection station 23 (FIG. 7). As best seen in FIGS. 2 and 7, imaging devices 30 are mounted at predetermined locations on the frame 20. The imaging devices 30 includes an upper imaging device 31, and a lower imaging device 32. As illustrated herein, the individual imaging devices normally comprise a pair of cameras which are directed to the area of the inspection station 23. It should be understood, however, that in particular applications single cameras may be employed in place of the pair of cameras as illustrated. A light source 33, is borne by the frame 20 and is operable to illuminate the inspection station 23. Further, an air manifold or air ejector 34, is positioned in the sorting station 24 (FIG. 7) and is operable to provide a selective, timed puff of air in response to a command from a control assembly 35 to remove undesirable products 14 from the air-borne product stream passing through the inspection and sorting stations 23 and 24. The control assembly 35 is borne by the frame 20, and is effective to coordinate the operation of the imaging devices 30, and associated air manifold 34 to sort undesirable products 14 or other debris, based upon operator preferences, from the product stream 14 passing through the inspection and sorting stations 23 and 24.

As best seen in FIGS. 2, 2A, and 7, the continuous conveyor belt 10 has an upper course 50 and a lower course 51. Further, the continuous conveyor belt 10 has an intake end 52 and an exhaust end 53. The intake end 52 is oriented in receiving relation relative to the intake conveyor or feeding device 13. Further, the exhaust end 53 is positioned in spaced relation relative to the inspection station 23. The continuous conveyor belt 10 is entrained about a drive roller 54 and a nose bar 55. The nose bar 55 has a diametral dimension of about 1.5 inches to about 4 inches. The continuous conveyor belt 10 may be in a configuration such that the upper course or surface 50 is substantially planar (FIG. 2A), or in a catenary profile as shown in FIGS. 2 and 7. A motor 56 (FIGS. 2 and 2A) is disposed in driving relation relative to the drive roller 54 and is operable to rotate the continuous conveyor belt 10 at a speed of about 400 feet per minute to about 800 feet per minute. This speed of movement is controlled by the control assembly 35.

Figure 5:
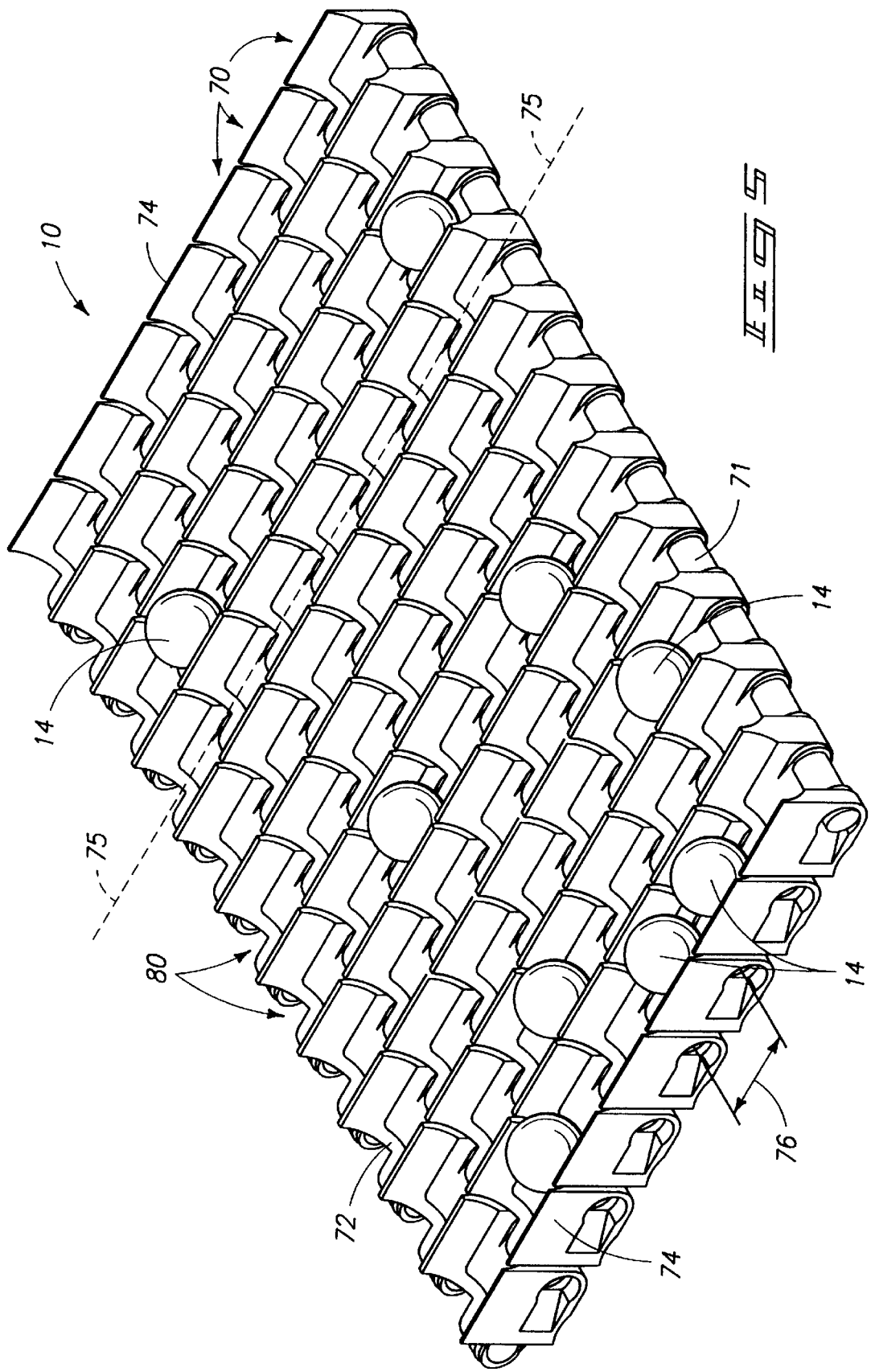
FIG. 5 is a perspective, plan view of a discrete section of the continuous conveyor belt assembly of the present invention carrying several objects to be inspected.

Referring now to FIGS. 3 and 5, the continuous conveyor belt 10 comprises a plurality of links 70 which are movably joined together by linking rods 71 which matingly engage same. The continuous conveyor belt 10 includes an outwardly facing product supporting surface 72, and an opposite, inwardly facing surface 73. The continuous conveyor belt 10 further has opposite peripheral edges 74, and a longitudinal axis which is designated by the line labeled 75. The individual links have a pitch of about 0.5 inches to about 1.5 inches. This is shown by the line labeled 76. It has been discovered that this dimension is critical to the operation of the continuous conveyor belt 10 inasmuch as the individual links, when passing about the nose bar 55, effectively minimizes the size of a resulting air-borne object pattern 90 (FIG. 7) passing through the sorting station 23. This object pattern will be discussed in greater detail hereinafter.

Figure 6:
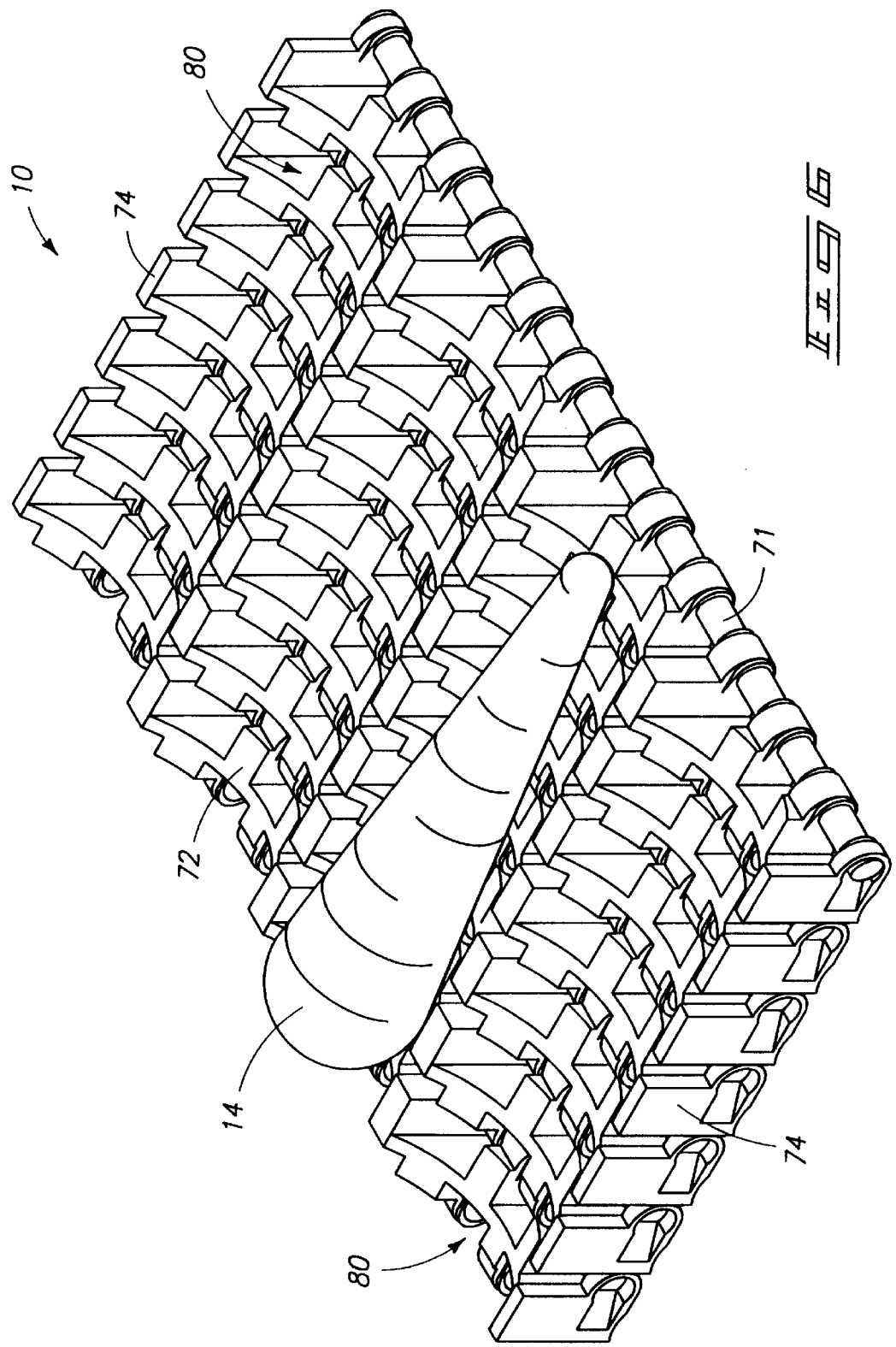
FIG. 6 is a perspective, plan view of a discrete section of the continuous conveyor belt assembly of the present invention, and which is shown in an alternate configuration.

As best seen by reference to FIG. 5, the individual links 70 are matingly joined together to form the outwardly facing surface 72 for supporting the objects 14 for movement along a given path of travel to the inspection station 23. This supporting surface 72 defines a plurality of substantially continuous, longitudinally oriented channels 80. The individual continuous channels 80 receive the objects 14 and space them a given distance apart when they are received in the individual channels (FIG. 4). The individual channels 80 are disposed in predetermined spaced, substantially parallel relation relative to the longitudinal axis 75. As earlier noted, and as seen in the drawings, each of the objects 14 to be sorted have a height dimension indicated by the line labeled 15 (FIG. 4), and which is represented by the variable x. In the present invention, the supporting surface 72 spaces the objects 14 a given distance apart which is equal to about 1.1x to about 2.4x. In this spacial arrangement, the imaging devices 30 are permitted to view substantially the entire surface area of the objects 14 as they pass, in free flight, through the off belt inspection station 23 and sorting station 24 respectively. In the present arrangement, the air manifold 34 (FIG. 7), which is located in the vicinity of the sorting station 24, is oriented about 6 inches to about 10 inches from the resulting air-borne object pattern 90, which travels through the inspection and sorting stations 23 and 24 respectively. As illustrated in FIG. 7, the sorting station 24 is disposed at a distance of about 5 inches to about 10 inches from the nose bar 55, and the object pattern 90 when measured in the vertical dimension at the sorting station 24 is about 0.25 inches to about 3 inches. This dimension varies based upon the weight of the objects 14, which are to be sorted. Further, it should be understood that the imaging devices 30 may, in one form of the invention, image across the entire width of the inspection station 23, or in an alternative form may image only across a discrete portion of the inspection station 23. The arrangement of the cameras is based, in some measure, upon the needs of the end user. An alternative form of the present invention is shown in FIG. 6. It should be understood that the continuous conveyor belt 10 of this design is operable to convey larger bulk products 14, however, the spacial relationship between the individual substantially continuous, longitudinally oriented channels 80 remains the same. As will be recognized the present modularized construction allows the continuous conveyor belt 10 to be easily repaired. In this regard, damaged links 70 can be easily removed and replaced by merely removing the respective linking rods 71, replacing the damaged links 70, and reinserting the interconnecting linking rods 71.

OPERATION

The operation of the preferred embodiments of the present invention are believed to be readily apparent and are briefly summarized at this point.

A continuous conveyor belt 10 for transporting a stream of objects 14 along a given path of travel to an inspection station 23 comprises a plurality of links 70 matingly joined together to form a surface 72 for supporting the objects 14 for movement along a given path of travel to the inspection station 23. The continuous conveyor belt 10 defines a plurality of substantially continuous, longitudinally oriented channels 80 for receiving the objects 14, and spacing the objects 14 a given distance apart. The objects 14 have a height dimension 15 which is represented by the variable x, and wherein the given distance the longitudinally oriented channels 80 space the individual objects 14 apart is equal to about 1.1x to about 2.4x. The individual links 70 have a pitch of about 0.5 inches to about 1.5 inches, and further has a backward flex of up to about 8 degrees. Preferably, the individual links 70 are manufactured from a light-weight high strength synthetic polymer. The continuous conveyor belt 10 is entrained between a drive roller 54 and a nose bar 55 which has a diametral dimension of about 1.5 inches to about 4 inches. The continuous conveyor belt 10 propels the objects 14 into free flight and in a given air-borne pattern 90 through a sorting station 24 which is disposed downstream of, and in spaced relation relative to the nose bar 55. The individual links 70, when passing about the nose bar effectively minimizes the size of the object pattern 90 passing through the sorting station. This minimally sized object pattern permits the air manifold 34 to be positioned quite closely relative thereto. In this location, the air manifold becomes optimal with respect to removing undesirable objects 14, or other debris from the object pattern 90 passing through the sorting station 24. Still further, the spacing of the objects 14 the given distance apart, as provided by the continuous conveyor belt 10, insures that the imaging devices 30 can view substantially the entire surface area of each of the objects 14 passing through the inspection station 23, as well as view each of the individual objects. This, of course, prevents products, having defects, or anomalies, from going through the inspection station 23 undetected. Previously, such defects might be shielded from view by other products which are traveling adjacent thereto but in blocking relationship relative to the field of view of the imaging devices 30.

As earlier discussed, the sorting station 24 is disposed approximately 5 inches to about 10 inches from the nose bar 55, and the object pattern 90, when measured in the vertical dimension at the sorting station, is about 0.25 inches to about 3 inches. Further, the air manifold 34, which is oriented in the sorting station 24, is positioned about 6 inches to about 10 inches from the object pattern 90 passing through the sorting station 24. It should be understood, in certain instances, and depending upon the product type, the inspection station could be located on-belt. As illustrated in the drawings, the inspection station 23 is located off-belt.

In compliance with the statute, the invention has been described in language more or less specific as to structural features. It is to be understood, however, that the invention is not limited to specific features shown and described, since the means of construction herein disclosed, comprise preferred forms of putting the invention into effect. The invention is, therefore, claimed in any of its forms or modifications within the proper scope of the appended claims appropriately interpreted in accordance with the Doctrine of Equivalents.

We claim:

1. A continuous conveyor belt for transporting a stream of objects to an inspection station, comprising:

a plurality of links matingly joined together to form a surface for supporting the objects for movement along a given path of travel to the inspection station, and wherein the continuous conveyor belt is entrained between a drive roller and a nose bar which has a given diametral dimension, and wherein the continuous conveyor belt propels the objects into free-flight and in a given pattern through a sorting station which is disposed downstream of, and in spaced relation relative to the nose bar, and wherein the individual links when passing about the nose bar effectively minimize the size of the object pattern passing through the sorting station.

2. A continuous conveyor belt as claimed in claim 1, wherein the nose bar is about 1.5 inches to about 4 inches in diameter.

3. A continuous conveyor belt as claimed in claim 2, wherein the individual links have a pitch of about 0.5 to about 1.5 inches.

4. A continuous conveyor belt as claimed in claim 3, wherein the supporting surface defines a plurality of substantially continuous, longitudinally oriented channels for receiving the objects and spacing the individual objects a given distance apart when they are received in the individual channels.

5. A continuous conveyor belt as claimed in claim 4, wherein an imaging device is positioned in the inspection station, and wherein the spacing of the objects permits the imaging device to view substantially the entire surface area of the objects as they pass through the inspection station.

6. A continuous conveyor belt as claimed in claim 5, wherein the objects have a given height dimension represented by the variable x, and wherein the supporting surface spaces the objects a given distance apart which is equal to about 1.1x to about 2.4x.

7. A continuous conveyor belt as claimed in claim 6, wherein the sorting station is disposed about 5 inches to about 10 inches from the nose bar, and wherein the size of the object pattern, when measured in the vertical dimension, is about 0.25 inches to about 3 inches.

8. A continuous conveyor belt as claimed in claim 7, wherein the continuous conveyor belt travels at a speed of about 400 feet per minute to about 800 feet per minute.

9. A continuous conveyor belt as claimed in 8, wherein the sorting station includes an air manifold which is oriented about 6 inches to about 10 inches from the object pattern passing through the sorting station.

10. A continuous conveyor belt as claimed in claim 9, wherein the inspection station is located on-belt and near the nose bar.

11. A continuous conveyor belt as claimed in claim 9, wherein the inspection station is located off-belt and in spaced relation relative to the nose bar.

12. A continuous conveyor belt as claimed in claim 11, wherein the objects of interest move in an air-borne stream through the inspection station, and the imaging device comprises a pair of imaging devices which are located above and below the air-borne stream which is passing through the inspection station.

13. A continuous conveyor belt as claimed in claim 12, wherein the inspection station has a given width dimension, and each of the imaging devices images across the entire width of the inspection station.

14. A continuous conveyor belt as claimed in claim 13, wherein the inspection station has a given width dimension, and each of the imaging devices images across a discreet portion of the width dimension.

15. A continuous conveyor belt for transporting a stream of objects to an inspection station, comprising:
a plurality of links matingly joined together to form a surface for supporting the objects for movement along a given path of travel to the inspection station, the individual links having a pitch of about 0.5 inches to about 1.5 inches, and wherein the plurality of links define a plurality of substantially continuous, longitudinally oriented channels for receiving the objects and spacing the individual objects a given distance apart.

16. A continuous conveyor belt as claimed in claim 15, wherein the continuous conveyor belt is entrained between a drive roller and a nose bar, and wherein the nose bar has a diameter of about 1.5 inches to about 4 inches.

17. A continuous conveyor belt as claimed in claim 15, wherein the continuous conveyor belt is entrained between a drive roller and a nose bar which has a diameter of about 1.5 inches to about 4 inches, and wherein the individual links when passing about the nose bar effectively minimizes a resulting air-borne object pattern.

18. A continuous conveyor belt as claimed in claim 17, wherein the continuous conveyor belt propels the objects into free flight, and wherein the inspection station is positioned on-belt and adjacent the nose bar, and wherein the objects propelled from the continuous conveyor travel through a sorting station which is disposed in spaced relation relative to the nose bar, and wherein the action of the individual links produces an air-borne object pattern in the sorting station which has a dimension, in the vertical direction, of about 0.25 inches to about 3 inches.

19. A continuous conveyor belt as claimed in claim 17, wherein the continuous conveyor belt propels the objects into free flight, and wherein the inspection station is positioned off-belt and in spaced relation relative to the nose bar, and wherein the objects propelled from the continuous conveyor belt travel, after passing through the inspection station, through a sorting station which is disposed downstream of the inspection station, and wherein the action of the individual links produces an air-borne object pattern in the sorting station which has a dimension, in the vertical direction, of about 0.25 inches to about 3 inches.

20. A continuous conveyor belt as claimed in claim 17, wherein the continuous conveyor belt propels the objects into free flight, and wherein the inspection station is positioned near the nose bar, and wherein the objects propelled from the continuous conveyor belt travel through an off-belt sorting station which is disposed in spaced relation relative to nose bar, and wherein the action of the individual links produces an air-borne object pattern in the sorting station which has a dimension, in the vertical direction, of less than about 3 inches.

21. A continuous conveyor belt as claimed in claim 20, wherein the inspection station is located on-belt and near the nose bar.

22. A continuous conveyor belt as claimed in claim 20, wherein the inspection station is located off-belt and in spaced relation relative to the nose bar.

23. A continuous conveyor belt as claimed in claim 22, wherein the objects move in an air-borne stream through the inspection station, and the imaging device comprises a pair of imaging devices which are located above and below the air-borne stream which is passing through the inspection station.

24. A continuous conveyor belt as claimed in claim 23, wherein the inspection station has a given width dimension, and each of the imaging devices images across the entire width of the inspection station.

25. A continuous conveyor belt as claimed in claim 23, wherein the inspection station has a given width dimension, and each of the imaging devices images across a discreet portion of the width dimension.

26. A continuous conveyor belt as claimed in claim 20, wherein the objects have a given height dimension represented by the variable x, and wherein the longitudinally disposed channels space the objects a given distance apart which is equal to about 1.1x to about 2.4x.

27. A continuous conveyor belt as claimed in claim 26, wherein the sorting station comprises an air manifold which is oriented at a distance of less than about 10 inches from the airborne object pattern.

28. A continuous conveyor belt as claimed in claim 27, wherein the continuous conveyor belt can be backwardly flexed to less than about 8 degrees.

29. A continuous conveyor belt for transporting a stream of objects, comprising:

an upwardly facing supporting surface for supporting the objects, the upwardly facing surface having a plurality of substantially continuous longitudinally disposed channels formed therein, and wherein the objects have a given height dimension represented by the variable x, and wherein the plurality of continuous channels are spaced a given distance apart which is substantially equal to about 1.1x to about 2.4x.

30. A continuous conveyor belt as claimed in claim 29, wherein the supporting surface comprises a plurality of links which are matingly joined together, and which have a pitch of about 0.5 inches to about 1.5 inches.

31. A continuous conveyor belt as claimed in claim 29, wherein the supporting surface comprises a plurality of links which are matingly joined together, and wherein the continuous conveyor is entrained between a drive roller and a nose bar which has a given diametral dimension, and wherein the continuous conveyor belt propels the objects, in free flight, and in a given air-borne pattern through a sorting station which is disposed downstream of, and in spaced relation relative to the nose bar, and wherein the individual links when passing about the nose bar effectively reduces the size of the object pattern passing through the sorting station.

32. A continuous conveyor belt as claimed in claim 31, wherein the nose bar is about 1.5 inches to about 4 inches in diameter.

33. A continuous conveyor belt for transporting a stream of objects, comprising:

an upwardly facing surface for supporting the objects of interest, the upwardly facing surface having a plurality of substantially continuous channels formed therein, and wherein the objects have a given height dimension represented by the variable x, and wherein the plurality of continuous channels are spaced a given distance apart which is equal to less than about 2.4x.

34. A continuous conveyor belt for transporting a stream of objects to an inspection station, comprising:

a plurality of links matingly joined together to form a surface for supporting the objects for movement along a given path of travel to the inspection station, and wherein the continuous conveyor belt defines a plurality of substantially continuous, longitudinally oriented channels for receiving the objects and spacing the objects a given distance apart, and wherein the objects have a given height dimension represented by the variable x, and wherein the given distance the longitudinally oriented channels spaces the individual objects apart is equal to about 1.1x to about 2.4x, and wherein the individual links have a pitch of about 0.5 inches to about 1.5 inches and the continuous conveyor belt is entrained between a drive roller and a nose bar which has a diametral dimension of less than about 1.5 to about 4 inches, and wherein the continuous conveyor belt propels the objects into free flight, and in a given air-borne pattern, through a sorting station which is disposed downstream of, and in spaced relation relative to the nose bar, and wherein the individual links when passing about the nose bar effectively minimizes the size of the air-borne object pattern passing through the sorting station.

35. A continuous conveyor belt for transporting a stream of objects to an off-belt inspection and sorting station, comprising:

an imaging device positioned in the inspection station; and a plurality of links matingly joined together to form a supporting surface for spacing the objects a predetermined distance apart and propelling the objects in free flight through the off-belt inspection and sorting stations, the predetermined distances between the individual objects permitting the imaging device to view substantially the entire surface area of the objects as they pass through the off-belt inspection and sorting stations.

36. A continuous conveyor belt as claimed in claim 35, wherein the objects move in an air-borne stream through the off-belt inspection and sorting stations, and the imaging device comprises a pair of imaging devices which are individually oriented above and below the air-borne stream in the inspection station.

37. A continuous conveyor belt as claimed in claim 36, wherein the inspection and sorting stations have a given width dimension, and each of the imaging devices images across the entire width of the inspection station.

38. A continuous conveyor belt as claimed in claim 36, wherein the inspection station has a given width dimension, and each of the imaging devices images across a discreet portion of the width dimension.

39. A continuous conveyor belt as claimed in claim 35, wherein the objects have a given height dimension represented by the variable x, and wherein the supporting surface spaces the objects a given distance apart which is equal to about 1.1x to about 2.4x.

40. A continuous conveyor belt as claimed in claim 39, wherein the supporting surface has a longitudinal axis, and wherein the supporting surface defines a plurality of substantially continuous, longitudinally oriented channels for receiving the objects.

41. A continuous conveyor belt as claimed in claim 35, wherein the supporting surface defines a plurality of channels for receiving the objects, and wherein the conveyor belt is substantially planar.

42. A continuous conveyor belt as claimed in claim 35, wherein the supporting surface defines a plurality of channels for receiving the objects, and wherein the conveyor belt has a catenary profile.

43. A continuous conveyor belt as claimed in claim 42, wherein a second conveyor delivers the objects to the individual channels of the continuous conveyor belt.

44. A continuous conveyor belt for transporting a stream of objects to an off-belt inspection station, comprising:

an imaging device positioned in a given orientation relative to the inspection station; and a plurality of links matingly joined together to form a supporting surface of the continuous conveyor for transporting the objects, and wherein the individual links each have a pitch of about 0.5 inches to 1.5 inches, and wherein the supporting surface defines a plurality of longitudinally disposed and substantially continuous channels which orient the objects in predetermined spaced relation to each other, the continuous conveyor belt propelling the individual objects in free flight through the inspection station, the predetermined spacial relationship of the individual objects being effective to permit imaging of substantially the entire surface area of the individual objects as each of the objects passes through the inspection station; and a second conveyor for delivering the stream of objects into the plurality of continuous channels.

45. A continuous conveyor belt as claimed in claim 44, wherein the objects have a given height dimension represented by the variable x, and wherein the predetermined spacial relationship between the individual channels is substantially about 1.1x to about 2.4x.

46. A continuous conveyor belt as claimed in claim 45, wherein the continuous conveyor belt is entrained about a drive roller and a nose bar, and wherein the nose bar has a diameter of less than about 1.5 inches to about 4 inches.

* * * * *